ns with a low friction, heat dispersable sealing member between the operating stem, plug and body of a plug valve.

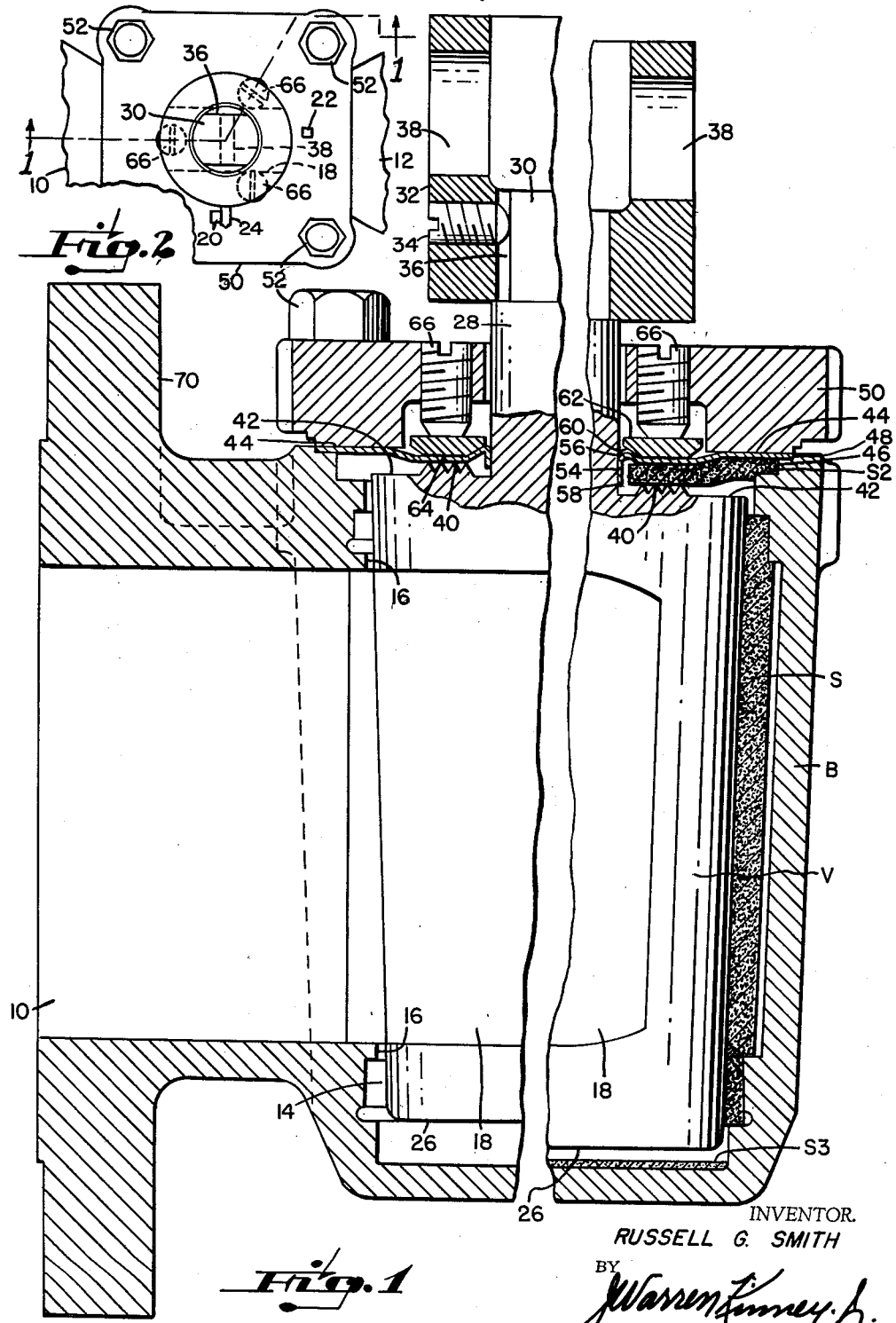

United States Patent Office 3,132,838
Patented May 12, 1964

3,132,838
PLUG VALVE HAVING AN AUXILIARY STEM SEAL
Russell G. Smith, Cincinnati, Ohio, assignor to Continental Manufacturing Company, Cincinnati, Ohio, a corporation of Ohio
Filed May 25, 1961, Ser. No. 112,655
11 Claims. (Cl. 251—214)

This invention relates to valves, and more particularly to means for providing a fluid-tight connection between the operating stem and body of a plug valve.

An object of the invention is to provide a permanent, pressure-distortable auxiliary sealing member in combination with a low friction, heat dispersable sealing member between the operating stem, plug and body of a plug valve.

Another object of the invention is to provide permanent, pressure-distortable auxiliary sealing means which will provide a metal-to-metal seal between adjacent portions of said auxiliary sealing means and the plug of a valve incident to dissipation of the normal, low friction, heat dispersable sealing means normally disposed between said auxiliary sealing means and said heat dispersible sealing means.

A further object of the invention is to provide a permanent, pressure distortable auxiliary sealing means in the form of a metallic diaphragm or disk provided with a central stem-receiving opening adapted to receive the cylindrical operating stem of the valving member or plug of a plug valve.

The valve herein disclosed embodies improvements upon the same type of valve disclosed in pending patent application Serial No. 105,592, filed April 26, 1961.

As in the copending application, an object of the present invention is to provide means to render the valve self-sealing and leakproof in the event that its sealing or lining elements disintegrate or volatilize when subjected to the destructive effects of a fire or conflagration in the vicinity of the valve, this being especially important when the substance controlled by the valve is flammable, explosive, or highly corrosive in character.

More specifically, an object of the present invention is to provide improved means in association with a valve of the character stated, for effecting a metal-to-metal auxiliary seal immediately replacing the seal destroyed by loss of the principal resilient sealing or lining means, particularly about the stem or shank of the valve plug.

Valves of the type herein disclosed are used quite frequently in high pressure pipelines, to control flow of inherently dangerous fluids such as hydrofluoric acid, rocket fuels, and other volatile and highly inflammable explosive or corrosive substances, which might greatly aggravate the hazard of a conflagration if permitted to escape from valves injured or rendered leaky by heating and dissipation of the lining or sealing materials normally depended upon to keep the valves tight and leakproof.

The valves used for the purpose above stated, generally utilize at their seats a sealing and lubricating material which normally is in the form of a solid plastic, highly resistant to wear and the deteriorating effects of corrosives, solvents, and the like. Such material may be a member of the polyethylene group, particularly the halogenated ethylenes, which possess the desired characteristics mentioned. Polytetrafluoroethylene, which is commercially known and available as Teflon, is such a material from which the sealing members of the present valve may be produced with excellent results. However, such sealing substances are subject to complete volatilization and dissipation when exposed to high temperature such as would be encountered in the event of a fire in the vicinity of the valve, with the result that the sealing substance depended upon for maintaining a leakproof condition of the valve would become ineffective and thus permit the valve to leak and release the hazardous fluid.

To overcome any tendency of the valve to leak when its liner or sealing material is destroyed or rendered ineffective, is a principal object of the present invention, particularly as concerns leakage about the operating stem or shank of the valve plug.

The foregoing and other objects are attained by the means described herein and illustrated upon the accompanying drawing, in which:

FIG. 1 is a fragmentary cross-sectional view of the improved valve of the invention, the view being taken on line 1—1 of FIG. 2, to show both the normal relationship of parts, and the relationship resulting from loss or dissipation of the sealing or lining elements.

FIG. 2 is a fragmentary top plan view of the valve, on a reduced scale.

With particular reference now to the drawing, the letter B denotes a body member, V a valving member, and S a resilient sealing member or sleeve which is interposed between the body and valving members.

Body member B includes an inlet port 10, an outlet port 12 and an intermediate plug or valving member receptive chamber 14. The chamber-adjacent or inner ends of ports 10 and 12 are substantially rectangular, and are bounded marginally each by a continuous peripheral lip 16 which may serve as a valve seat or valving surface complementary to and adapted to be engaged by the valving member V in the event of dissipation of the sealing material S, all as fully explained in the copending application hereinbefore identified.

By way of review, it may be pointed out that the sealing member S is in the form of a sleeve which lines the chamber 14 and within which the plug or valving member V may be rotated to open or close the valve ports. The sleeve or sealing member S is constructed and proportioned normally to embrace the valving member V, while maintaining a very slight clearance between the valving member and the lips 16 of the inlet and outlet valve ports.

In the event of dissipation of the sleeve or sealing member S by intense heat while the valve is closed, pressure of fluid at the inlet port 10 bodily shifts the valving member V laterally, causing it to contact the lip 16 of the outlet port and thereby effect a metal-to-metal seal which immediately seals off the outlet port to prevent passage of fluid through the valve, notwithstanding loss of the sealing means S.

As will be understood, the character 18 indicates the flow passage of valving member V, which may be simply a transverse through opening therein, for placing the inlet and outlet ports in or out of communication with one another as the valving member is rotated to open or closed positions. Rotation of the valving member may be limited by stationary lugs or stops 20 and 22, to be struck by a finger 24 which moves with the valving member.

In FIG. 2, the finger is shown contacting the stop 20 for establishing the open position of the valving member, wherein passageway 18 thereof places the inlet and outlet ports of the valve body in fluid communication. A quarter turn of the valving member V will, of course, place finger 24 against stop 22, in which position the passageway 18 will assume a position transverse to the inlet and outlet ports 10 and 12, for blocking flow of fluid through the ports.

In the event that intense heat destroys and dissipates the sealing means of Teflon, pressure of fluid at the inlet port 10 will not only shift the valving member V bodily laterally as previously explained, but in addition, there will be an accumulation of fluid under pressure beneath the valving member acting upon its bottom face 26 to bodily elevate the valving member as indicated at the left in FIG. 1. Such elevating of the valving member V is to produce an effective seal, in accordance with the present invention, preventing escape of fluid under pressure past the stem or shank 28 of the valving member as will be explained presently.

It will be noted that the stem or shank 28 may be integral with the valving member, and concentric thereto, and extends upwardly to a position of accessibility so that its upper end 30 may have affixed thereto an actuator 32 whereby the stem may be manually rotated. The actuator may be in the form of a metallic block fixed as by means of a set screw 34, driven against a flat 36 formed upon the stem. A transverse opening 38 may be provided in the block, for receiving a rod or bar serving as a handle for rotating the stem.

A series of concentric rings or ribs 40 may be turned or otherwise formed upon the upper circular face 42 of the valving member about stem 28, said rings or ribs being upstanding upon the face 42 in substantial concentricity with the stem axis. When the valve is initially assembled, the rings abut and effect a fluid-tight seal against the lower face of a washer-shaped or disc-like sealing member S2 of Teflon or the like, which may be considered a bonnet seal member (at the right in FIG. 1). The opposite or upper face of member S2 may be backed up by a circular auxiliary sealing disc 44 of flexible resilient metal which overlies the sealing member S2 entirely.

To keep the sealing member S2 and sealing disc 44 centered relative to the valving member chamber 14, the upper end of the chamber may be provided with concentric annular inner shoulders 46 and 48 which confine, respectively, the outer edges of member S2 and disc 44. The shoulders provide annular ledges upon which these parts S2 and 44 may rest at their outer margins. Said marginal portions are to be clamped tightly upon the ledges which support them, by means of an overlying mounting or bonnet plate 50 secured to the valve body by means of cap screws or equivalent fasteners 52.

It should be noted that the auxiliary sealing disc 44, of flexible metal, has a center opening 54 to quite snugly though rotatably embrace the stem or shank 28 of the valving member V. The center opening 54 is defined by an annular bead 56 which projects upwardly relative to the mean plane of the disc, and an integral depending annular skirt 58 projecting in the opposite direction from the mean plane of the disc. The skirt forms in effect a short tube snugly surrounding the stem but permitting the stem to rotate therein.

The bead 56 and skirt 58 are flexible, and subject to deformation as shown at the left in FIG. 1, when fluid under high pressure is applied thereto from beneath. Such deformation, when occurring, is in an upward and inward direction, forcing the bead to impact tightly within a crotch formed between the stem and an annular incline 60 of a clamp washer 62 which overlies the sealing disc 44 and loosely surrounds stem 28 adjacent to bead 56. The clamp washer 62 has a lower planar face 64 which clamps against the sealing disc directly above the rings or annular ribs 40, thereby to firmly set the resilient sealing member S2 upon the several concentric rings. The clamping of washer 62 may be effected by a plurality of set screws 66 threadedly supported in bonnet plate 50 at several locations about stem 28, to individually apply downward force upon washer 62 axially of the stem.

Under normal conditions, the clamp washer 62 firmly clamps the sealing member S2 against rings 40 of the valving member, thereby to maintain a primary seal precluding fluid leakage upwardly along stem 28. However, when the sealing member S2 is dissipated or completely volatilized by intense heat, pressure of fluid in the inlet port of the valve will act upon the lower face 26 of plug V to elevate the plug within its chamber, as at the left in FIG. 2, to place the concentric rings 40 in sealing contact with flexible disc 44, while at the same time the pressure of fluid acts upon the skirt 58 and bead 56 of said disc, to deform these areas and thus produce a tight seal against stem 28.

It must be understood that intense heating dissipates not only the sealing member S2, but the sealing member S also, so that the pressure of fluid at the inlet port 10 laterally shifts the valve plug bodily against the lip surrounding the outlet port as previously explained. This lateral shifting of the plug or valving member V, and the upward displacement thereof above mentioned, must occur without restraint if the valve is to perform dependably to avoid leakage in the presence of intense heat or fire. For this reason, it is necessary to provide ample clearance between stem 28 and the central bores of washer 62 and bonnet plate 50, permitting particularly the bodily lateral shifting of valving member or plug V. Accordingly, an excess of clearance is provided at the locations mentioned. The thin flexible sealing disc 44 affords no appreciable resistance to valve plug shiftability, as it will yield and conform about the stem or shank 28.

The character S3 indicates a disc of Teflon or equivalent material placed in the valve member chamber against the bottom wall thereof, which is of no particular concern to the present invention. At 70 is indicated a flange surrounding the inlet port of the valve body, used for making connection to a pipe system for fluid conveyance. A similar flange, not shown, may be associated with the outlet port of the valve body, in accordance with common practice.

It is to be understood that various modifications and changes may be made in the structural details of the device, within the scope of the appended claims, without departing from the spirit of the invention. Reference may be had to the aforementioned pending application, for information as to any ancillary construction details.

What is claimed is:

1. A plug valve comprising a body member having an open-topped chamber therein and inlet and outlet flow passage, a valving member having an upper contact face, and a heat dispersable sealing sleeve lining the chamber of the body member, said valving member and said sleeve lining including a through flow passage, the chamber being lined by the sealing sleeve and supporting the valving member for rotation therein to place the flow passage of said valving member in and out of communication with the flow passages of the sleeve and body member, fluid under pressure being admitted into the valve chamber beneath and against the bottom of the valving member tending to elevate the valving member upon heat-dispersion of said supporting sleeve, a stem extending axially from the valving member and through the open top of the body member chamber for rotating the valving member, a heat dispersable sealing disc surrounding the stem and having an area resting upon and having sealing engagement against the upper contact face of the valving member, means including a bonnet plate clamping the peripheral margin of the sealing disc onto the body member in covering relationship with the open top of the body member chamber, and means intermediate the bonnet plate and the upper face of the said sealing disc, for effecting an auxiliary seal about and against the stem upon heat-dispersion of the sealing sleeve and the sealing disc and said elevation of the valving member toward the bonnet plate by the action of fluid pressure within the chamber against the bottom of the valving member.

2. The valve as set forth in claim 1, wherein the auxiliary seal means includes a flexible heat-resistant relatively indestructible sealing disc clamped over the chamber top and having a center opening flanked by a deformable skirt which is induced to snugly embrace the valving member stem by and upon the said elevation of the valving member by said pressure of fluid within the chamber.

3. The valve as set forth in claim 2, wherein the combination includes a rigid washer overlying and bearing upon the said flexible heat-resistant relatively indestructible sealing disc, and which washer has an annular inclined surface disposed about the valving member stem, for urging the deformation of the said skirt of the flexible sealing disc toward and against said stem.

4. The valve as set forth in claim 3, wherein the rigid washer and the bonnet plate surrounding the valving member stem, have a stem clearance greater than the clearance between said stem and the skirt of the flexible sealing disc.

5. A plug valve comprising a body member having an open-topped chamber therein, a valving member having a flow passage therethrough and having an upper contact face, and a heat consumable sealing sleeve lining the chamber of the body member, said members including flow passages, the chamber being lined by the sealing sleeve which supports the valving member for rotation within the sleeve free of contact with the interior wall of the chamber, fluid under pressure being admitted into the valve chamber beneath and against the bottom of the valving member tending to elevate the valving member upon heat dissipation of said sleeve, a stem on the valving member extending axially therefrom and through the open top of the body member chamber, for rotating the valving member to place the flow passage thereof in and out of communication with the flow passages of the sleeve and body member, a heat dispersable sealing disc surrounding the stem and having an area resting upon and having sealing engagement against the upper contact face of the valving member, a heat-resistant relatively indestructible second disc overlying the heat dispersable sealing disc and surrounding the stem, means anchoring said discs upon the body member in spanning relationship to the open top of the body member chamber for closing said chamber, and deformable means on said second disc surrounding and engaging said stem and operative upon dissipation of the heat dispersable consumable sleeve and sealing disc, to form a tight seal with the stem under pressure of fluid admitted into the body member chamber beneath and elevating the valving member.

6. The combination as set forth in claim 5, wherein the deformable means of the said heat-resistant relatively indestructible second disc possesses a degree of resiliency sufficient to maintain its seal against the stem notwithstanding bodily lateral shifting of the valving member within its chamber induced by pressure of fluid therein and the absence of the consumable sealing sleeve which normally centers the valving member within the chamber.

7. A plug valve comprising a body member having an open-topped chamber therein, and a valving member having an upper contact face, said members including flow passages, a stem on the valving member extending axially therefrom and through the open top of the body member chamber, for rotating the valving member to place the flow passage thereof in and out of communication with the flow passages of the body member, a consumable sealing disc apertured to surround the stem and having an area marginally of the aperture to rest upon the upper contact face of the valving member, a heat-resistant relatively indestructible second disc of flexible thin metal apertured to surround the stem and adapted to overlie the consumable sealing disc, means anchoring said second disc upon the body member in spanning relationship to the open top of the body member chamber for closing said chamber, an upwardly directed continuous bead formed marginally about the aperture of the second disc, and a flexible skirt depending from said bead to form a tube within which the stem of the valving member may snugly rotate, said tube and bead being thin-walled and deformable about the stem under the influence of fluid pressure within the chamber of the body member.

8. The combination as set forth in claim 7, wherein is included a disc clamp including means to control deformation of the bead and skirt.

9. The combination as set forth in claim 8, wherein said disc clamp is in the form of a centrally apertured rigid washer loosely surrounding the stem, and having a continuous annular incline disposed marginally of the central aperture to accommodate the bead, and means for depressing said washer firmly against the thin metal flexible disc in the direction of the upper contact face of the valving member.

10. A valve structure comprising a body having an open top chamber therein and having flow passages opening into the chamber, a rotary plug in said chamber having a transverse flow passage therethrough and having a top end contact surface and a stem extending axially from said surface through said open top, a bonnet plate secured to and covering said open top of the body and having an aperture through which the stem extends, said plug being axially shiftable in the chamber, a heat consumable sealing annulus on said contact surface and encircling and spaced from said stem, a heat-resistant relatively indestructible flexible annular disc encircling said stem and positioned upon said annulus, said annulus and said disc being peripherally sealingly secured by the bonnet to the top of said body, said disc having sealing engagement with and around the stem, a rigid washer encircling and spaced from the stem and having a relatively wide flat lower face lying upon said annular disc, and set screws extending through and having threaded connection with said bonnet, and bearing upon the upper side of said washer and forcing said washer toward the plug and compressing the sealing annulus against the said top end contact surface of the plug, said annular disc having a tubular skirt defining the open center thereof and snugly engaging the stem, the disc being formed with an upstanding bead joining it to said skirt, and said washer having a chamfered lower inner edge lying upon said bead and functioning to compress and distort the bead against the stem to increase the frictional engagement of the skirt with the stem upon forcible upward movement of the plug.

11. A valve structure comprising a body having a plug chamber therein, said chamber having an open top and a closed bottom, the body having aligned flow passages therethrough opening into the chamber, a rotary plug in said chamber having a flow passage transversely therethrough and having a top end contact surface and a stem extending axially from said surface through said open top of the body, the plug having a plurality of concentric rings upstanding from said surface and concentric with the stem, a bonnet plate secured to and covering said open top of the body and having an aperture through which the stem extends, heat dispersable means in the chamber for sustaining the plug in operative position, fluid under pressure being admitted to the bottom part of the chamber upon dispersion of said means between the bottom end of the plug and the closed bottom portion of the chamber whereby to impose an axial upward thrust to the plug, said plug being axially shiftable in the chamber, a heat consumable sealing annulus resting upon said concentric ring in encircling relation with and spaced from said stem, a heat-resistant relatively indestructible flexible annular disc encircling said stem and positioned upon said annulus, said annulus and disc being peripherally sealingly secured by the bonnet to the top of said body, said disc having sealing engagement with and around the stem, a rigid washer encircling and spaced from the stem and having a relatively wide flat lower face lying upon said annular disc directly above said rings, the said annular disc having the central opening thereof defined by a tubular skirt encircling and snugly engaging the stem and extending downwardly, the disc being formed with an upstanding bead joining it to said skirt, said washer having a chamfered lower inner edge lying upon said bead and functioning to compress and distort the bead against the stem to increase the frictional engagement of the skirt with the stem upon forcible upward movement of the plug, said bonnet having threaded apertures extending therethrough and directed toward the top of said rigid washer, and set screws in said threaded apertures extending inwardly from the bonnet and bearing upon the upper side of said washer and forcing said washer toward the plug and compressing the sealing annulus against the underlying concentric upstanding rings.

References Cited in the file of this patent

UNITED STATES PATENTS

| | | | |
|---|---|---|---|
| Re. 17,724 | Nordstrom | | July 8, 1930 |
| 1,575,125 | Nordstrom | | Mar. 2, 1926 |
| 2,069,013 | Nordstrom | | Jan. 26, 1937 |
| 2,229,120 | Nordstrom | | Jan. 21, 1941 |
| 2,447,510 | Langdon | | Aug. 24, 1948 |
| 2,699,916 | Johnson | | Jan. 18, 1955 |
| 2,868,499 | Kaminsky | | Jan. 13, 1959 |
| 2,876,987 | Renfro | | Mar. 10, 1959 |
| 2,942,840 | Clade | | June 28, 1960 |
| 2,986,374 | Rakus | | May 30, 1961 |
| 2,994,504 | Reed | | Aug. 1, 1961 |
| 3,061,269 | Sinkler | | Oct. 30, 1962 |
| 3,066,909 | Reed | | Dec. 4, 1962 |

FOREIGN PATENTS

| | | |
|---|---|---|
| 596,197 | Italy | July 9, 1959 |